(12) United States Patent  
Gardin

(10) Patent No.: US 7,100,464 B2
(45) Date of Patent: Sep. 5, 2006

(54) SPLINED CONNECTION

(75) Inventor: Michael Gardin, Lidingo (SE)

(73) Assignee: Scania CV AB (publ), (SE)

( * ) Notice: Subject to any disclaimer, the term of this patent is extended or adjusted under 35 U.S.C. 154(b) by 0 days.

(21) Appl. No.: 10/848,295

(22) Filed: May 17, 2004

(65) Prior Publication Data

(30) Foreign Application Priority Data

May 21, 2003 (SE) .................................. 0301479

(51) Int. Cl.
*B60K 17/28* (2006.01)
*F16D 1/06* (2006.01)

(52) U.S. Cl. ................ 74/15.84; 192/70.2; 192/110 R; 403/359.1

(58) Field of Classification Search ............... 192/70.2, 192/110 R, 110 S; 74/15.84; 403/359.1; 277/912
See application file for complete search history.

(56) References Cited

U.S. PATENT DOCUMENTS

| | | | | |
|---|---|---|---|---|
| 2,861,435 A | | 11/1958 | Seanor ........................... 64/9 |
| 3,004,438 A | * | 10/1961 | Funk et al. ................. 74/15.63 |
| 3,197,216 A | | 7/1965 | Jackson ...................... 277/137 |
| 3,320,824 A | | 5/1967 | Riley, Jr. et al. .............. 74/443 |
| 3,508,418 A | * | 4/1970 | Jones ........................ 464/162 |
| 3,937,300 A | | 2/1976 | Avery ........................... 184/70 |
| 4,081,218 A | * | 3/1978 | Gabriel ........................ 403/24 |
| 4,126,018 A | | 11/1978 | Okuda ........................... 64/23 |
| 4,475,737 A | | 10/1984 | Cook .......................... 277/182 |
| 4,580,996 A | | 4/1986 | Brissette ..................... 464/133 |
| 4,666,024 A | * | 5/1987 | Blond et al. ............. 192/70.16 |
| 4,771,864 A | * | 9/1988 | Lorimor et al. ................ 184/6 |
| 4,904,214 A | | 2/1990 | Eick ............................. 440/83 |

FOREIGN PATENT DOCUMENTS

GB 2117487 10/1983

* cited by examiner

*Primary Examiner*—Richard M. Lorence
(74) *Attorney, Agent, or Firm*—Ostrolenk, Faber, Gerb & Soffen, LLP

(57) ABSTRACT

A splined connection comprises a shaft with longitudinal radially outwardly protruding ridges and intermediate grooves, a hub provided with correspondingly shaped ridges and intermediate grooves and is adapted to being fitted in engagement with the shaft ridges and grooves to provide between the shaft and the hub a connection region causing the shaft and hub to rotate together. A sealing arrangement adapted to close off the connection region. The sealing arrangement comprises two annular sealing elements applied at an axial distance from one another and adjacent to the connection region so that the sealing elements are each in continuous contact with a surface of the shaft around the whole of their inner radial surface and in continuous contact with a surface of the hub around the whole of their outer radial surface.

7 Claims, 2 Drawing Sheets

SPLINED CONNECTION

BACKGROUND TO THE INVENTION, AND STATE OF THE ART

The present invention relates to a splined connection and particularly to elements which orient the shaft and hub connected and also seal that connection.

Splined connections are used in various applications in connection with torque transmission. Splined connections are particularly advantageous in cases where axial mobility between components is required. A splined connection usually comprises a shaft-shaped element provided with longitudinal protruding ridges and intermediate grooves, and a hub-shaped element provided with correspondingly shaped ridges and intermediate grooves and intended to be fitted in engagement with the ridges and grooves of the shaft so that a connection region causing the shaft and hub to rotate together is formed between them.

An example of such an application is in connection with transmission of torque from an engine to a power takeoff of a vehicle. In such cases the power takeoff may be connected to the engine's flywheel via the hub of the splined connection. The power takeoff is thus driven directly by the engine independently of the clutch. The splined connection is then situated inside a housing which encloses the clutch. The shaft will be hollow so that it can extend externally about the vehicle's input shaft to the gearbox. To enable the gearbox to be fitted, the splined connection region between hub and shaft needs to exhibit a certain amount of clearance.

A problem with such clearance between the hub and the shaft is that lubricant supplied to the connection region is readily ejected during operation. The space in the clutch housing also makes oil lubrication of the connection region impossible and grease lubrication can only be supplied sparingly, to avoid risk of grease reaching clutch plates situated in the vicinity of the splined connection. The space in the clutch housing contains a great deal of dust and particles. There is risk of such particles entering the connection region. The risk of particles accumulating in the connection region increases with the magnitude of the clearance. Finally, said clearance between hub and shaft allows obliqueness and radial displacement of the shaft relative to the hub. It is usual for such obliqueness and radial displacement to occur particularly at low load of the power takeoff. Obliqueness and radial displacement result in relative movement between hub and shaft in the connection region, causing wear of the surfaces in the splined connection region.

U.S. Pat. No. 4,126,018 refers to a spindle device intended to connect two rotating shafts. The spindle device comprises a spindle connected to two separate hubs in different splined connection regions. Each of the two hubs comprises a sealing device situated at an end portion of the region of connection of the respective hub to the spindle. However, the sealing devices do not seem to extend all the way down into the grooves between the ridges of the spindle. They therefore do not come into contact with the bottom surfaces of the grooves. This means that there is no absolute seal between spindle and hub in the splined connection regions. Each of the hubs is thus supported at only an end portion of a sealing device. A sealing device applied in this way does not provide stable support to prevent possible obliqueness of the hubs relative to the spindle.

U.S. Pat. No. 4,475,737 refers to a splined connection in a driveline. The splined connection comprises an annular seal arranged between a hub and a shaft at a relatively large distance from a connection region between the hub and the shaft. A sealing plug is arranged on the opposite side of the connection region. The plug is fastened so that it covers an end aperture in the hub. The shaft does not extend right up to the plug, which means that the plug provides no support surface for the shaft. There is thus risk of the shaft being at an angle to the hub during operation, particularly if the clearance between hub and shaft is large.

SUMMARY OF THE INVENTION

One object of the present invention is to provide a splined connection whereby the connection region between hub and shaft comprises sealing means reliably preventing lubricant leaking out while at the same time preventing ingress of dirt and ambient particles. Another object is to prevent obliqueness and radial displacement between shaft and hub in the connection region.

These objects are achieved with the splined connection of the kind mentioned in the introduction which includes the elements disclosed herein. Two annular sealing elements are arranged in the connection so that each of them comes to continuous abutment against a contact surface of the shaft (the shaft being arranged radially inside) and a contact surface of the hub (the hub being arranged radially outside) ensures that the sealing elements completely fill and cover the radial clearance between the shaft and hub. There is thus assurance that the lubricant applied in the connection region between hub and shaft will not leak out. Supplying lubricant to the connection region between hub and shaft and fitting said sealing elements result in a long period of good lubrication of the surfaces of the connection region. At the same time, the sealing elements prevent ingress of dirt and ambient particles into the connection region. The two annular sealing elements also serve as spacers which tend to maintain the centred position of the shaft relative to the hub. As the annular elements completely filling the radial gap between shaft and hub are at a distance from one another, they effectively counteract any angling of the shaft relative to the hub.

According to a preferred embodiment of the invention, at least one of said annular seals comprises an elastic material. An elastic material ensures a good seal between shaft and hub even when axial movements between shaft and hub occur. However, the elastic material needs rigidity such as to provide stable support surfaces which effectively counteract obliqueness and radial displacement of the hub relative to the shaft. With advantage, at least one of said annular seals is an O-ring. O-rings are inexpensive to procure and have good sealing characteristics. Suitably dimensioned O-rings which also have suitable material characteristics provide stable support surfaces.

According to another preferred embodiment of the invention, at least one of said contact surfaces on the shaft is situated at a substantially constant radial distance from an axis of rotation of the splined connection. Said contact surface therefore exhibits a circular shape and can be fitted with an elastic O-ring so that the latter's inner radial surface will abut with a specific pressure round the surface of the whole shaft. The result is an optimum seal. The contact surface of the shaft may be situated level with the shaft grooves. The shaft will thus be relatively uncomplicated in shape and can be manufactured at relatively low cost. Correspondingly, at least one of said contact surfaces of the hub may be situated at a substantially constant radial distance from said axis of rotation. The contact surface of the hub therefore exhibits a circular shape, and an elastic O-ring can be fitted inside the hub so that its outer radial surface will abut with a specific pressure round the inside surface of the whole hub. The result is a substantially optimum seal. The contact surface of the hub may be situated level with the hub grooves. The hub will thus be relatively uncomplicated in shape and can be manufactured at relatively low cost.

According to another preferred embodiment of the invention, at least one of said sealing elements is adapted to being fitted in an annular space which is defined not only by said contact surface of the shaft and said contact surface of the hub but also by sidewalls which delineate the width of the annular space. Said sidewalls prevent lateral movements of the sealing elements even if there are axial movements between shaft and hub. One such sidewall may be defined by end surfaces of the shaft ridges. The shaft ridges preferably do not extend right up to an end surface of the shaft. The shaft may thus have a contact surface adjacent to the ridge end surfaces which thus constitute sidewalls preventing axial movement of sealing elements in an axial direction. Alternatively, the shaft ridges may comprise a common break at one point so that a circumferential recess is created. Such a recess has on both sides of it sidewalls defined by the ridge end surfaces. One of said sidewalls may be defined by the hub ridge end surfaces. The hub ridges may be made shorter than the width of the hub. The hub may thus have contact surfaces adjacent to the ridge end surfaces which thus define a sidewall preventing axial movement of the sealing element. Alternatively the hub ridges may comprise a break at a common point so as to create a circumferential recess. Such a recess has on both sides of it sidewalls defined by the ridge end surfaces.

According to another preferred embodiment of the invention, the splined connection is arranged as a transmission element in a power takeoff of a vehicle. In that case the location of the splined connection may make it difficult to supply lubricant after assembly. Said sealing elements situated at a distance from one another on different sides of the connection region result in completely sealed enclosing of the connection region. This means that the lubricant originally supplied to the connection region can be effectively retained. In addition, the two sealing elements provide support surfaces situated at a distance from one another so that obliqueness and radial displacement of the shaft relative to the hub are counteracted. The splined connection may be arranged in a housing which contains a clutch of the vehicle. Such a housing makes it very difficult to supply lubricant to the connection region. At the same time, plenty of dust and particles occurs within such a housing. Said sealing elements retain lubricant in the connection region while at the same time effectively preventing ingress of particles into the connection region.

BRIEF DESCRIPTION OF THE DRAWINGS

An example of a preferred embodiment of the invention is described below with reference to the attached drawings, in which.

DETAILED DESCRIPTION OF A PREFERRED EMBODIMENT OF THE INVENTION

Figure 1:
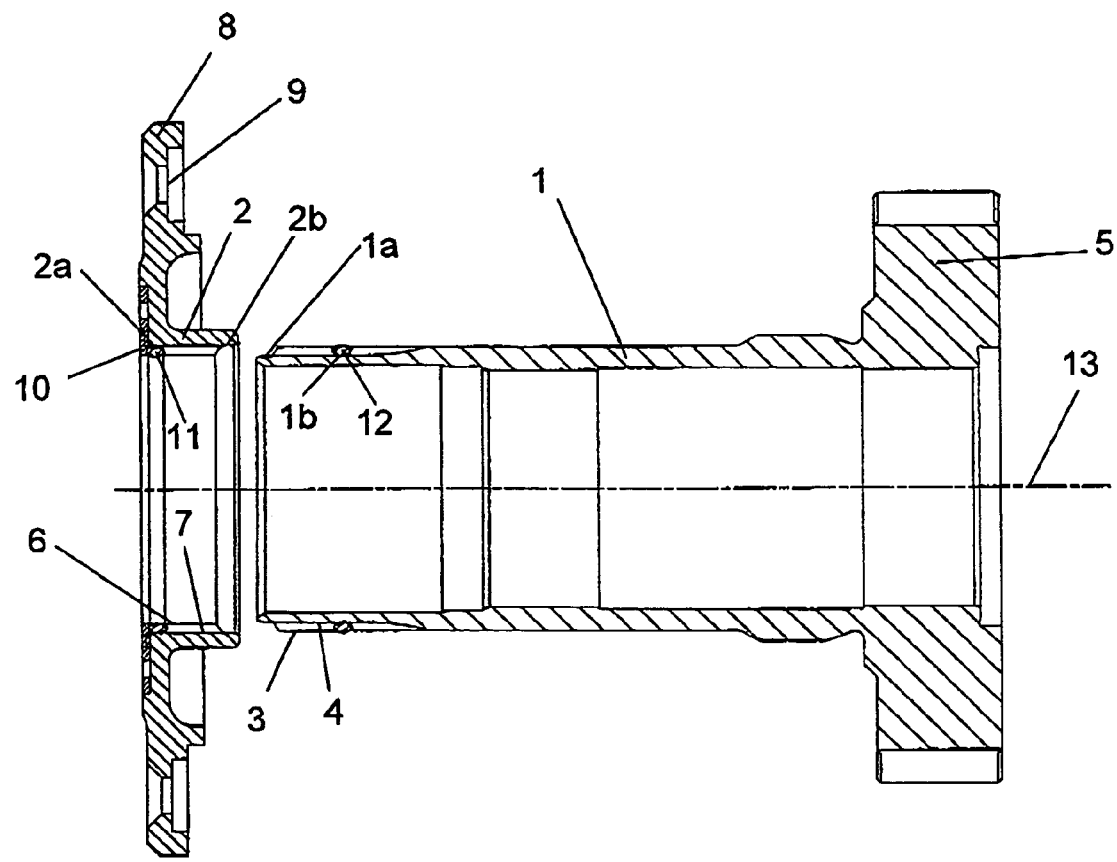
FIG. 1 is a cross-section of a splined connection according to the present invention in an unassembled state and FIG. 2 depicts the splined connection as a transmission element in a power takeoff of a vehicle.

FIG. 1 depicts a splined connection in an unassembled state. The splined connection comprises mainly two parts, namely a shaft 1 and a hub 2. The shaft 1 has at one end splining, which in a conventional manner comprises a multiplicity of longitudinal protruding ridges 3 and intermediate grooves 4 between the ridges. The ridges 3 and grooves 4 are usually arranged at uniform intervals around the circumference of the shaft 1. At an opposite end, the shaft 1 comprises a firmly attached gearwheel 5. In the case depicted, the shaft 1 is hollow. The splined connection comprises a hub 2 which has internally arranged splining. The splining of the hub is likewise provided in a conventional manner with a multiplicity of ridges 6 and intermediate grooves 7. The ridges 6 and grooves 7 of the hub are adapted to fit in engagement with the ridges 3 and grooves 4 of the shaft so as to provide a connection causing the shaft 1 and hub 2 to rotate together in the splined connection region. The hub 2 comprises a disc-shaped portion 8 with a substantially radial extent. The disc-shaped portion 8 has running through it a multiplicity of holes 9 to accommodate fastening elements for connecting the hub to a rotatable means. An annular element 10 is fastened to one side of the hub 2.

A first O-ring 11 and a second O-ring 12 are applied at an axial distance from one another on their respective sides of the connection region between the shaft 1 and the hub 2. The first O-ring 11 is adapted to being applied in a first annular space between the shaft 1 and the hub 2. The hub ridges 6 do not extend right up to the end surfaces of the hub. The hub 2 thus has a first contact surface 2a situated immediately to the left of the ridges 6 in FIG. 1. The hub's first contact surface 2a is situated at a substantially constant radial distance from an axis of rotation 13 of the splined connection so that the surface exhibits a circular shape. The hub's first contact surface 2a is situated at substantially the same radial distance from the axis of rotation 13 as the hub grooves 7. The hub's first contact surface 2a constitutes an outer radial surface of the first annular space which is adapted to accommodating the first O-ring 11. The annular element 10 has a circular aperture delineated by a radial surface which is situated at substantially the same radial distance from the axis of rotation 13 as the hub ridges 6. The annular element 10 thus forms a sidewall of the first annular space on one side of the hub's contact surface 2a. The end surfaces of the hub ridges 6 form a second sidewall on the opposite side of the hub's contact surface 2a. The shaft ridges 3 do not extend right up to the end surface of the shaft 1. The shaft 1 thus has a first contact surface 1a to the left of the ridges 3 in FIG. 1. The shaft's first contact surface 1a is situated at a substantially constant radial distance from the axis of rotation 13 so that it exhibits a circular shape. The shaft's first contact surface 1a is situated at substantially the same radial distance from the axis of rotation 13 as the shaft grooves 4. The shaft's first contact surface 1a is adapted to constituting an inner radial surface in the first annular space which is adapted to accommodating the first O-ring 11 when the shaft 1 is fitted to the hub 2.

The second O-ring 12 is adapted to being applied in a second annular space between the shaft 1 and the hub 2. The hub ridges 6 have an axial extent which thus does not extend right up to the end surfaces of the hub. The hub 2 thus comprises a second contact surface 2b which is situated on the right side of the ridges 6 in FIG. 1. The hub's second contact surface 2b is likewise situated at a substantially constant radial distance from the axis of rotation 13 and therefore exhibits a circular shape. The hub's second contact surface 2b is situated at substantially the same radial distance from the axis of rotation 13 as the hub grooves 7. The hub's second contact surface 2b constitutes the outer radial surface in the second annular space which is adapted to accommodating the second O-ring 12. The shaft ridges 3 comprise a recess with a width which corresponds to a desired width of the second annular space. The end surfaces of the ridges 3 thus constitute sidewalls on their respective sides of the recess and of the second annular space. The shaft 1 comprises at the same time a second contact surface 1b which forms a bottom surface in the recess. The shaft's second contact surface 1b exhibits a circular shape. The shaft's second contact surface 1b is situated at substantially the same radial distance from the axis of rotation 13 as the shaft's first contact surface 1a, i.e. at the same height as the shaft grooves 4. The shaft's second contact surface 1b constitutes the inner radial surface in the second annular space which is adapted to accommodating the second O-ring 12.

When the shaft 1 and the hub 2 are to be fitted together, the first O-ring 11 is applied in the hub 2 in the, at this stage, open first annular space which is here defined by the hub's first contact surface 2a and the sidewalls constituted by the annular element 10 and the end surfaces of the ridges 6. The second O-ring 12 is applied round the shaft 1 in its, at this stage, open second annular space defined here by the shaft's second contact surface 1b and the sidewalls defined by the end surfaces of the shaft ridges 3 round the space. Lubricant is supplied to the connection region between the shaft 1 and the hub 2. Thereafter the shaft 1 is pushed into the hub 2 until the end surfaces of the shaft ridges 3 come into contact with the first O-ring 11 and the second O-ring 12 comes to abut against the end surfaces of the hub ridges 6. In this situation, the shaft's first contact surface 1a has reached a position radially inside the first O-ring 11, and the hub's second contact surface 2b a position radially outside the second O-ring 12. The first O-ring has a thickness such that round the whole of its outer radial surface it is in continuous contact with the first contact surface 2a of the hub and round the whole of its inner radial surface it is in continuous contact with the first contact surface 1a of the shaft. Correspondingly, the second O-ring has a thickness such that round the whole of its outer radial surface it is in continuous contact with the second contact surface 2b of the hub and the round whole of its inner radial surface it is in continuous contact with the second contact surface 1b of the shaft. The first O-ring 11 and the second O-ring are in this case of substantially identical design. In a fitted state, the first O-ring 11 and the second O-ring 12 thus enclose the whole connection region between the shaft 1 and the hub 2. This makes it possible for the lubricant supplied to the connection region to be retained. Ingress of particles and pollutants of various kinds into the connection region is also prevented. Finally, the O-rings provide support surfaces for the shaft 1 and the hub 2 on their respective sides of the connection region so as to counteract obliqueness and radial displacement of the shaft 1 relative to the hub 2 during operation.

Figure 2:
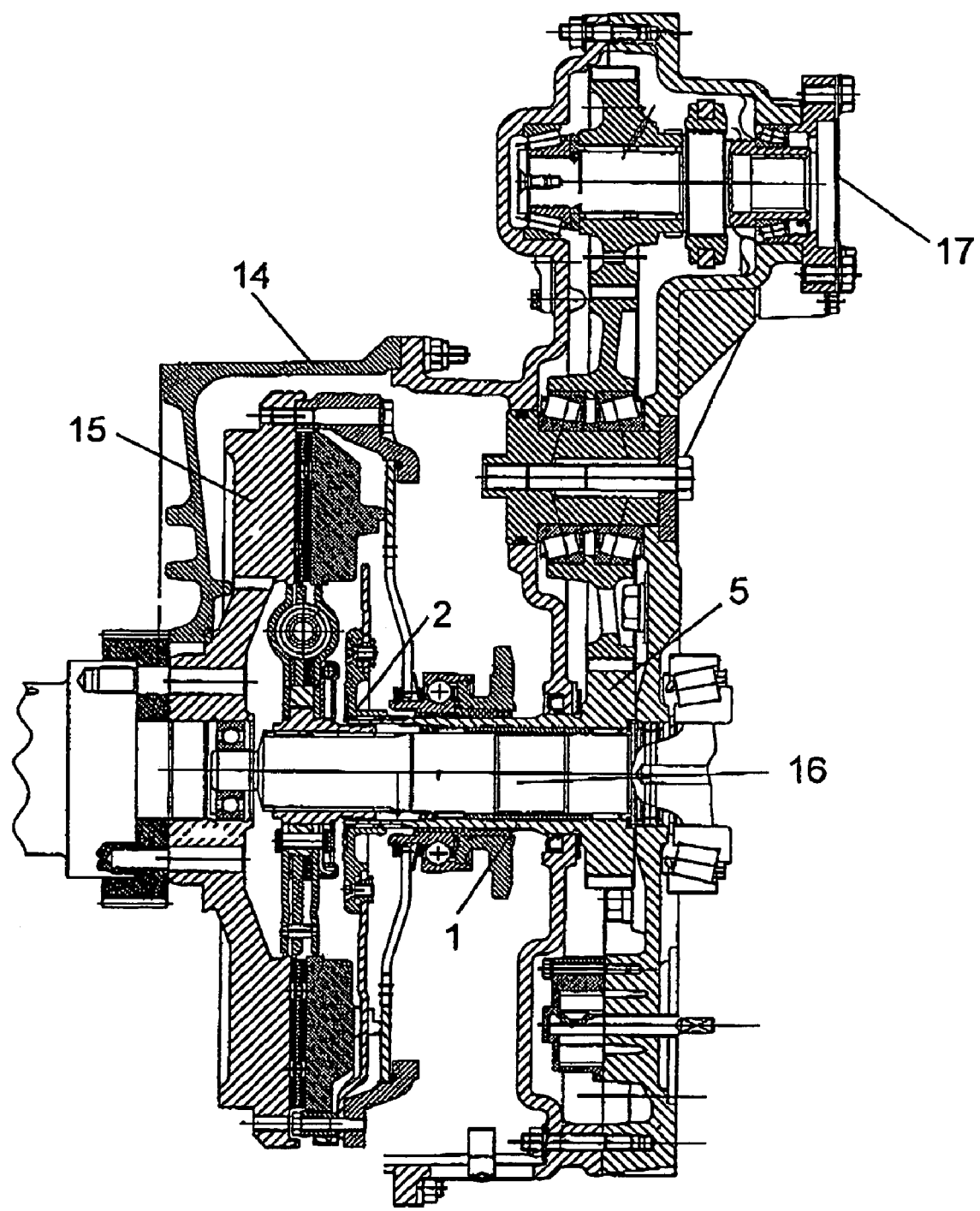

FIG. 2 depicts use of the splined connection according to the invention as a transmission element in a power takeoff of a vehicle. In many cases it is desirable that the power takeoff of a vehicle be driven directly by the engine independently of the clutch. In such cases the splined connection may be situated on the inside of a housing 14 which encloses the clutch. The hub 2 of the splined connection is here connected to the engine's flywheel 15 by fastening elements extending through the holes 9 in the disc-shaped portion 8 and through various other components. The rotary motion of the flywheel 15 is thus transmitted directly to the hub 2. The rotary motion of the hub 2 is transmitted via the splined connection to the shaft 1. The shaft 1 in this case is hollow so that it can have an extent outside the vehicle's input shaft 16 to the gearbox. The movements of the shaft 1 are transmitted via the gearwheel 5 and a number of other transmission elements to a plate 17 for the attachment of appliances intended to be driven by the power takeoff. To enable for the gearbox to be fitted in the vehicle, the connection region between the shaft 1 and the hub 2 needs to be provided with a certain clearance. A problem about such clearance is that lubricant supplied to the connection space between the shaft 1 and the hub 2 is readily ejected during operation. With the present application of the first O-ring 11 and the second O-ring 12 on their respective sides of the connection region, the lubricant is retained. Ingress of dust and particles into the connection region from the clutch housing 14 is also effectively prevented. In the case of a conventional splined connection, obliqueness and radial displacement commonly occur in the connection region between the shaft 1 and the hub 2, particularly at low load of the power takeoff. Such obliqueness and radial displacement are effectively counteracted by applying the first O-ring 11 and the second O-ring 12.

The invention is in no way limited to the embodiment described but may be varied freely within the scopes of the claims. The splined connection may thus be used for transmitting rotary motion in substantially any desired context. The sealing elements need not be O-rings and may be substantially any seals appropriate to the function.

The invention claimed is:

1. A splined connection comprising:
    a shaft with ridges protruding radially outward from an exterior surface of the shaft and extending longitudinally along the length of the shaft, intermediate grooves being formed between the ridges,
    a hub with ridges protruding radially inward from an interior surface of the hub and extending in a direction corresponding to the longitudinal direction along the length of the shaft, intermediate grooves being formed between the ridges, the hub ridges and grooves being adapted to fit in engagement with the shaft grooves and ridges, respectively, thus forming a connection region between the shaft and the hub and causing the shaft and the hub to rotate together around an axis of rotation,
    a sealing arrangement closing off the connection region, the sealing arrangement comprising two annular sealing elements located at an axial distance from one another adjacent to the connection region, the sealing elements being sized and shaped to each be in continuous contact with a contact surface of the shaft around the inner radial surface of the two annular sealing elements and in continuous contact with a contact surface of the hub around the outer radial surface of the two annular sealing elements,
    at least one of the two annular sealing elements being fitted in an annular space bounded by at least one sidewall which is defined by end surfaces of the shaft ridges or end surfaces of the hub ridges, the annular space being further bounded by the contact surface of the shaft and the contact surface of the hub, the contact surface of the shaft being located at substantially the same radial distance from the axis of rotation as the shaft grooves and the contact surface of the hub being located at substantially the same radial distance from the axis of rotation as the hub grooves.

2. A splined connection according to claim 1, wherein at least one of the two annular sealing elements is comprised of an elastic material.

3. A splined connection according to claim 2, wherein at least one of the two annular sealing elements is an O-ring.

4. A splined connection according to claim 1, wherein at least one of the contact surfaces of the shaft is situated at a substantially constant radial distance from an axis of rotation of the splined connection.

5. A splined connection according to claim 4, wherein at least one of the contact surfaces of the hub is situated at a substantially constant radial distance from an axis of rotation of the splined connection.

6. A power takeoff of a vehicle including a transmission element comprising a splined connection, the splined connection comprising:
   a shaft with ridges protruding radially outward from an exterior surface of the shaft and extending longitudinally along the length of the shaft, intermediate grooves being formed between the ridges,
   a hub with ridges protruding radially inward from an interior surface of the hub and extending in a direction corresponding to the longitudinal direction along the length of the shaft, intermediate grooves being formed between the ridges, the hub ridges and grooves being adapted to fit in engagement with the shaft grooves and ridges, respectively, thus forming a connection region between the shaft and the hub and causing the shaft and the hub to rotate together around an axis of rotation,
   a sealing arrangement closing off the connection region, the sealing arrangement comprising two annular sealing elements located at an axial distance from one another adjacent to the connection region, the sealing elements being sized and shaped to each be in continuous contact with a contact surface of the shaft around the inner radial surface of the two annular sealing elements and in continuous contact with a contact surface of the hub around the outer radial surface of the two annular sealing elements,
   at least one of the two annular sealing elements being fitted in an annular space bounded by at least one sidewall which is defined by end surfaces of the shaft ridges or end surfaces of the hub ridges, the annular space being further bounded by the contact surface of the shaft and the contact surface of the hub, the contact surface of the shaft being located at substantially the same radial distance from the axis of rotation as the shaft grooves and the contact surface of the hub being located at substantially the same radial distance from the axis of rotation as the hub grooves.

7. The power takeoff of claim 6, further comprising a housing which encloses a clutch of the vehicle and wherein the splined connection is arranged inside the housing.

* * * * *